(12) United States Patent
Bradshaw et al.

(10) Patent No.: US 8,883,097 B2
(45) Date of Patent: Nov. 11, 2014

(54) SULFIDISATION PROCESS AND APPARATUS FOR ENHANCED RECOVERY OF OXIDISED AND SURFACE OXIDISED BASE AND PRECIOUS METAL MINERALS

(75) Inventors: Deidre Jane Bradshaw, Indooroopilly (AU); Andrew James Haigh Newell, Spring Hill (AU)

(73) Assignee: University of Cape Town, Cape Town (ZA)

( * ) Notice: Subject to any disclaimer, the term of this patent is extended or adjusted under 35 U.S.C. 154(b) by 172 days.

(21) Appl. No.: 12/514,926

(22) PCT Filed: Nov. 13, 2007

(86) PCT No.: PCT/IB2007/054603
§ 371 (c)(1),
(2), (4) Date: Jul. 29, 2009

(87) PCT Pub. No.: WO2008/059439
PCT Pub. Date: May 22, 2008

(65) Prior Publication Data
US 2009/0317313 A1    Dec. 24, 2009

(30) Foreign Application Priority Data
Nov. 15, 2006   (ZA) .................................. 200609492

(51) Int. Cl.
*C22B 3/46*   (2006.01)
*C22B 3/00*   (2006.01)
*C22B 3/02*   (2006.01)
(52) U.S. Cl.
CPC .... *C22B 3/00* (2013.01); *C22B 3/02* (2013.01)
USPC ................... 423/22; 423/1; 423/138; 423/45; 423/99; 423/89; 423/49; 423/53; 423/508
(58) Field of Classification Search
None
See application file for complete search history.

(56) References Cited

U.S. PATENT DOCUMENTS

| | | | | |
|---|---|---|---|---|
| 3,883,421 | A | * | 5/1975 | Cutting et al. ..................... 209/1 |
| 4,600,505 | A | * | 7/1986 | Mair et al. ......................... 209/9 |
| 5,855,770 | A | * | 1/1999 | Clark et al. ................... 209/166 |
| 7,028,845 | B2 | * | 4/2006 | Senior .......................... 209/166 |

FOREIGN PATENT DOCUMENTS

EP    0 808 910 A2    11/1997

(Continued)

OTHER PUBLICATIONS

Newell, A.J.H. et al.: "The development of a sulfidisation technique to restore the flotation of oxidised pentlandite", *Minerals Engineering* 20 (2007), pp. 1039-1046.

(Continued)

*Primary Examiner* — Melissa Stalder
(74) *Attorney, Agent, or Firm* — Frommer Lawrence & Haug LLP; Ronald R. Santucci (57) ABSTRACT

A method of treating value bearing material comprising oxidized or surface oxidized mineral values includes the steps of crushing the value bearing material, contacting the crushed material! with a sulfide solution to sulfide the oxidized or surface oxidized mineral values, and adding ions of a selected base metal to the crushed value bearing material. The value bearing material may comprise oxidized or surface oxidized base metal or precious metal minerals. The crushed value bearing material is prepared as a slurry or pulp comprising from 15% to 40% solids and the remainder comprising water. The sulfide solution preferably comprises a soluble sulfidiser such as sodium hydrosulfide and the base-metal ion solution preferably comprises metal salt of base metals like copper or iron. In a preferred embodiment of the method, the sulfide ion concentration in the slurry is measured with an ion-specific probe which measures the sulfide ion concentration as a potential, and the quantity of sulfidiser solution in the slurry is adjusted to maintain the measured sulfide ion concentration at or near the predetermined value. The invention extends to an installation for treating value bearing material according to the method.

12 Claims, 5 Drawing Sheets

(56) References Cited

FOREIGN PATENT DOCUMENTS

| | | |
|---|---|---|
| EP | 0808 910 A3 | 7/1998 |
| RU | 2 149 709 C1 | 5/2000 |
| RU | 2 179 595 C1 | 2/2002 |
| WO | WO 96/00308 A2 | 1/1996 |
| WO | WO 96/00308 A3 | 1/1996 |

OTHER PUBLICATIONS

Newell, A.J.H. et al.: "Restoring the flotability of oxidised sulfides using sulfidisation", *Int. J. Miner. Process.*, 84 (2007) pp. 108-117.

Newell, A.J.H. et al.: "The effect of heavy oxidation upon flotation and potential remedies for Merensky type sulfides", *Minerals Engineering* 19 (2006) pp. 675-686.

* cited by examiner

SULFIDISATION PROCESS AND APPARATUS FOR ENHANCED RECOVERY OF OXIDISED AND SURFACE OXIDISED BASE AND PRECIOUS METAL MINERALS

This application is a 371 of PCT/IB2007/054603 filed on Nov. 13, 2007, published on May 22, 2008 under publication number WO 2008/059439 A and claims priority benefits of South African Patent Application No. 2006/09492 filed Nov. 15, 2006, the disclosure of which is incorporated herein by reference.

BACKGROUND OF THE INVENTION

THIS invention relates to a method of treating value-bearing material comprising oxidised minerals. The method has particular application in the recovery of base and precious metal minerals. The invention also relates to an installation for carrying out the method.

The production and subsequent use of base and precious metals from their associated minerals plays an important role in the technological and economic well-being of society. In the separation processes commonly employed to recover these base and precious metal minerals, oxidised surfaces significantly impact upon the efficacy of such processes. These oxidised mineral surfaces most commonly arise through the oxidation processes that occur during the weathering of a sulfidic ore-body, however they can also occur during the mining and processing of that ore-body, forming both oxidised and surface oxidised minerals.

One solution that has been successfully applied to some oxidised minerals, typically malachite, cerussite and heterogeneite, has been aqueous sulfidisation. In this approach, the oxidised surfaces are converted to a sulfide surface using a soluble sulfide or hydrosulfide salt and thus become amenable to recovery by conventional downstream processing operations that can exploit surface differences, such as froth flotation.

However, not all oxidised and surface oxidised minerals are amenable to sulfidisation, generally due to reasons associated with process kinetics. Not only do such difficult to treat minerals represent a valuable and unattainable resource, but without recovery they both directly and indirectly impact upon the financial viability of a mineral recovery operation involved in the exploitation of an ore-body. Moreover, minerals that are not recovered by the downstream process report to the tailings, and upon containment and continued exposure to the environment, oxidise and release poisonous base-metal ions and other contaminants such as acid.

It is an object of the invention to provide a method of treating oxidised minerals in order to render them amenable to recovery by further progressing, and an installation for carrying out the method.

SUMMARY OF THE INVENTION

According to the invention there is provided a method of treating value bearing material comprising oxidised or surface oxidised mineral values, the method including the steps of:
(a) crushing the value bearing material;
(b) contacting the crushed value bearing material with a sulfide solution to sulfidise the oxidised or surface oxidised mineral values; and
(c) adding ions of a selected base metal to the crushed value bearing material.

The value bearing material may comprise oxidised or surface oxidised base metal or precious metal minerals.

The minerals may be surface oxidised sulfide and related base metal and precious metal minerals.

Surface oxidised sulfide base metal minerals may be copper, nickel, iron, zinc, lead, cobalt, manganese, chromium, vanadium, cadmium, mercury and bismuth, for example.

Surface oxidised sulfide precious metals may be gold, silver and platinum group elements, particularly platinum and palladium, for example.

Related minerals may include arsenides, antimonides, selenides and tellurides.

Alternatively, the minerals may comprise the oxidised base and precious metal minerals often referred to as base and precious metal "oxide" minerals, including oxides, hydroxides, oxy-hydroxides, carbonates, hydroxy-carbonates, sulfates, hydroxy-sulfates, phosphates, silicates, hydroxy-silicates, arsenates, chromates and vandanates, for example.

The crushed value bearing material is preferably prepared as a slurry or pulp, which may comprise from 15% to 40% solids and the remainder comprising water.

The sulfide solution preferably comprises a soluble sulfidiser such as sodium hydrosulfide.

Preferably, the concentration of sulfide ions is maintained at a predetermined value during the sulfidisation step.

In a preferred embodiment of the method, the sulfide ion concentration in the slurry is measured with a suitable ion-specific probe which measures the sulfide ion concentration as a potential, and the quantity of sulfidiser solution in the slurry is adjusted to maintain the measured sulfide ion concentration at or near the predetermined value.

The step of adding ions of a selected base metal to the crushed value bearing material (step (c)) is preferably carried out by adding a soluble base metal salt to water to prepare a solution of base metal ions, and adding the solution to the slurry.

Preferably, the required quantity of base metal ions is added to the slurry during the step of contacting the crushed value bearing material with a sulfide solution (step (b)) after the desired sulfidisation potential has been achieved.

The soluble base-metal salts may conveniently be selected from those that are commonly available and the most cost effective such as, but not limited to, iron, copper, nickel, cobalt, manganese, zinc, lead, chromium, vanadium, mercury, etc. In practice, iron and copper salts would appear to be the most practical choices as either sulfates, chlorides or nitrates.

Further according to the invention there is provided an installation for treating value bearing material comprising oxidised or surface oxidised mineral values, the installation comprising:
a vessel having an inlet for crushed value bearing material and an outlet for treated material;
a first valve arranged to control the addition of a sulfide solution to the crushed value bearing material;
a first sensor for measuring the concentration of the sulfide solution admixed with the crushed value bearing material and for generating an output corresponding to the measured concentration;
a first controller responsive to the output of the first sensor and arranged to control the operation of the first valve to maintain the concentration of the sulfide solution at or near a desired value;
a second valve arranged to control the addition of a base metal ion solution to the crushed value bearing material;
a second sensor for measuring the concentration of the base metal ion solution admixed with the crushed value bearing material and for generating an output corresponding to the measured concentration; and a second controller responsive to the output of the second sensor and arranged to control the operation of the second valve to maintain the concentration of the base metal ion solution at or near a desired value.

The first sensor preferably comprises an Oxidation-Reduction Potential (ORP) probe, and the second sensor preferably comprises a base-metal ion probe.

DESCRIPTION OF AN EMBODIMENT

The present invention relates to a technique whereby sulfidisation can be successfully employed to create sulfide surfaces on oxidised and surface oxidised base and precious metal minerals, thus making them amenable to recovery by downstream processing stages. Such processes exploit the freshly formed sulfide surface nature of the treated minerals and include techniques such as, but not limited to, flocculation, electrophoresis and froth flotation.

There are two group of minerals to which the technique relates. Group 1 includes, but is not limited to, surface oxidised sulfide and related minerals of the base-metal category (for example, but not limited to, copper, nickel, iron, zinc, lead, cobalt, manganese, chromium, vanadium, cadmium, mercury, bismuth, etc.) and precious metal category (for example, but not limited to, gold, silver and the platinum group elements (PGE), particularly platinum and palladium). The related minerals include, but are not limited to, arsenides, antimonides, selenides and tellurides. Some of these surface oxidised minerals respond readily to sulfidisation, such as oxidised chalcopyrite, while others respond very poorly, such as oxidised pentlandite. The sulfidisation technique of the invention offers a means of preparing these minerals for recovery, and the application of the described technique further improves the downstream process recovery with savings in sulfidiser consumption. For the minerals of this group that are not readily sulfidised using traditional means, the prescribed technique offers a solution whereby mineral recovery can be achieved.

The second group of minerals, namely Group 2, includes, but is not limited to, the oxidised base and precious metal minerals, often referred to as base and precious metal 'oxide' minerals. They include, but are not limited to, the oxides, hydroxides, oxy-hydroxides, carbonates, hydroxy-carbonates, sulfates, hydroxy-sulfates, phosphates, silicates, hydroxy-silicates, arsenates, chromates, vandanates, etc. While many of these minerals are amenable to sulfidisation, such as malachite and cerussite, the technique of the invention provides for better recoveries with significantly lower sulfidisation consumption rates.

Improved recoveries and even more significant reagent savings are found in the case of oxidised minerals where sulfidisation occurs under intense conditions as required for, but not limited to, the zinc minerals smithsonite, hydrozincite and calamine as well as the cobalt minerals such as heterogeneite.

Finally within this group, there are oxidised minerals which respond poorly or not all to sulfidisation. These include, but are not limited to, chrysocolla, pyromorphite, pseudo-malachite, and vanadanite. The described technique offers a solution not hitherto previously provided and causes the oxidised minerals to develop a sulfide surface, thereby making the treated mineral surfaces amenable to recovery by downstream processes that can exploit surface differences.

Figure 1:
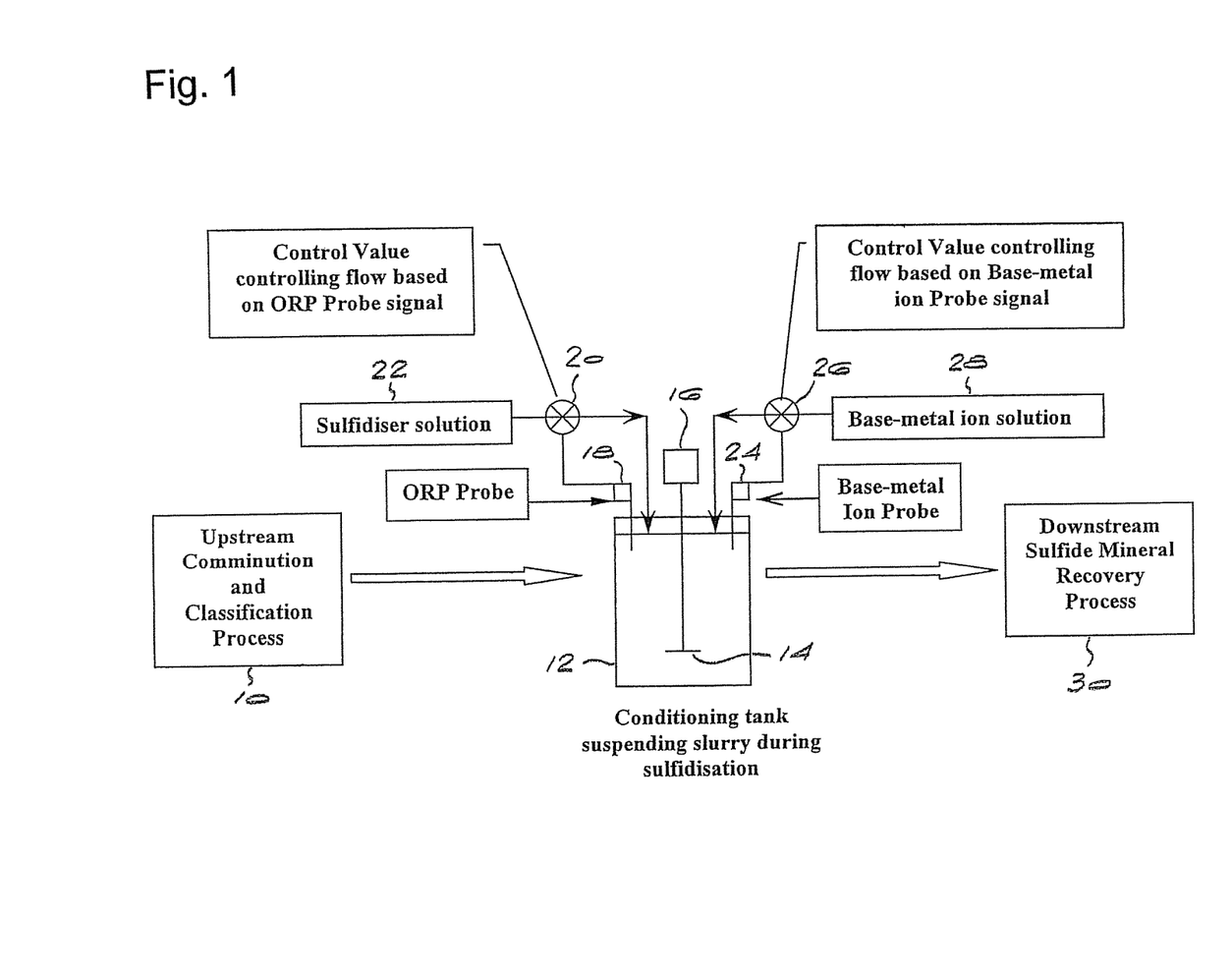
FIG. 1 is a simplified schematic diagram of an installation for treating value bearing material according to the invention, showing major components and control parameters thereof.

Referring now to the drawings, FIG. 1 shows, schematically, an installation for treating value bearing material received from an upstream comminution and classification process 10. The installation includes a conditioning tank 12 with an agitator 14 driven by a motor 16 in a conventional manner. The installation further includes an Oxidation-Reduction Potential (ORP) probe 18, the output of which is used as a control value to control a valve 20. The valve 20 regulates the flow of a sulfidiser solution from a reservoir 22 into the conditioning tank.

The installation further includes a base-metal ion probe 24, the output of which is used as a control value for a valve 26 which regulates the flow of a base metal ion solution from a reservoir 28 into the conditioning tank 12. Downstream of the tank 12 is a sulfide mineral recovery process 30 of a generally conventional nature.

Figure 2:
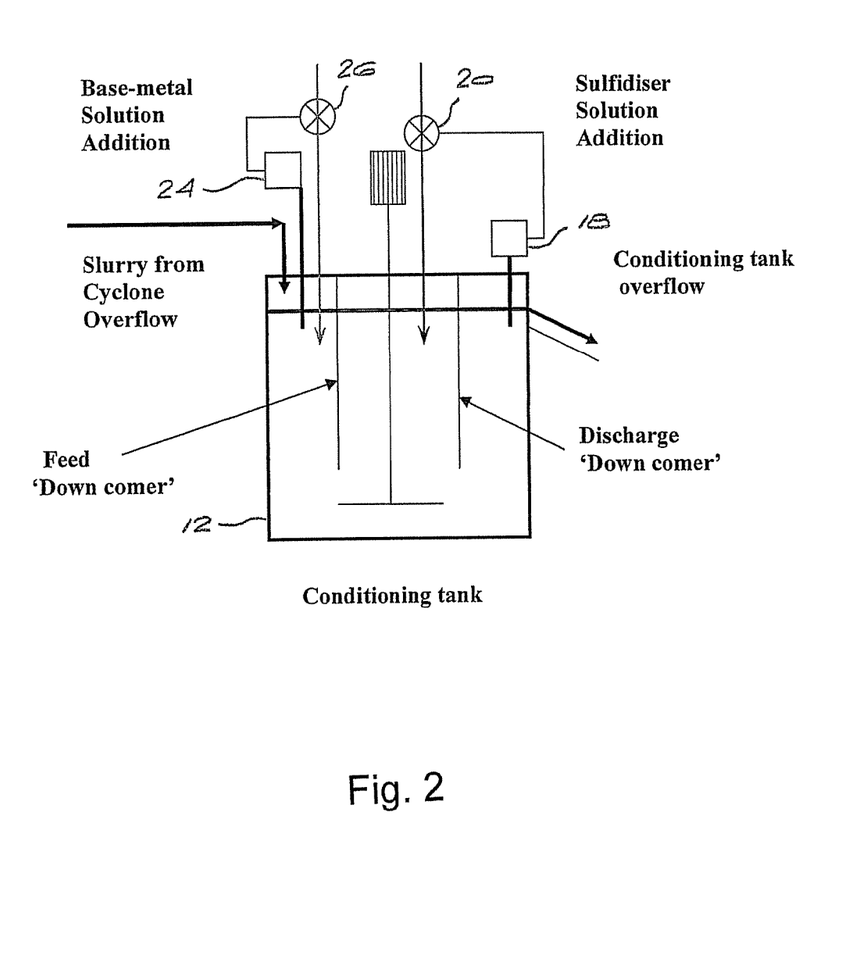
FIGS. 2, 3 and 4 are schematic diagrams similar to FIG. 1, showing alternative arrangements of the installation.
Figure 3:
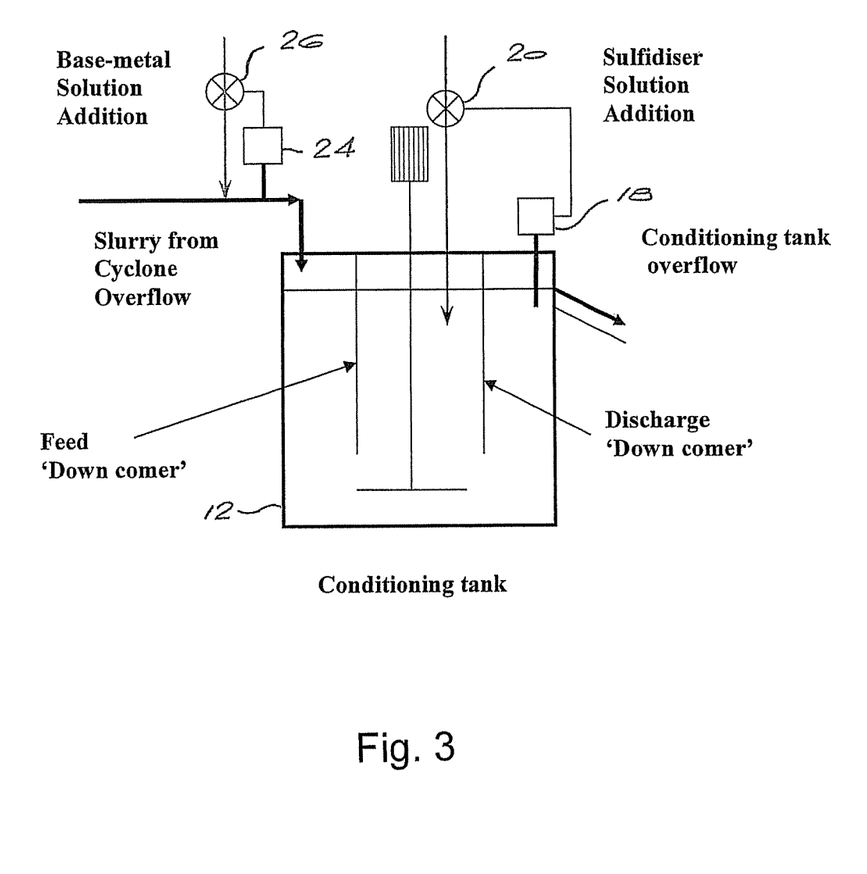
Figure 4:
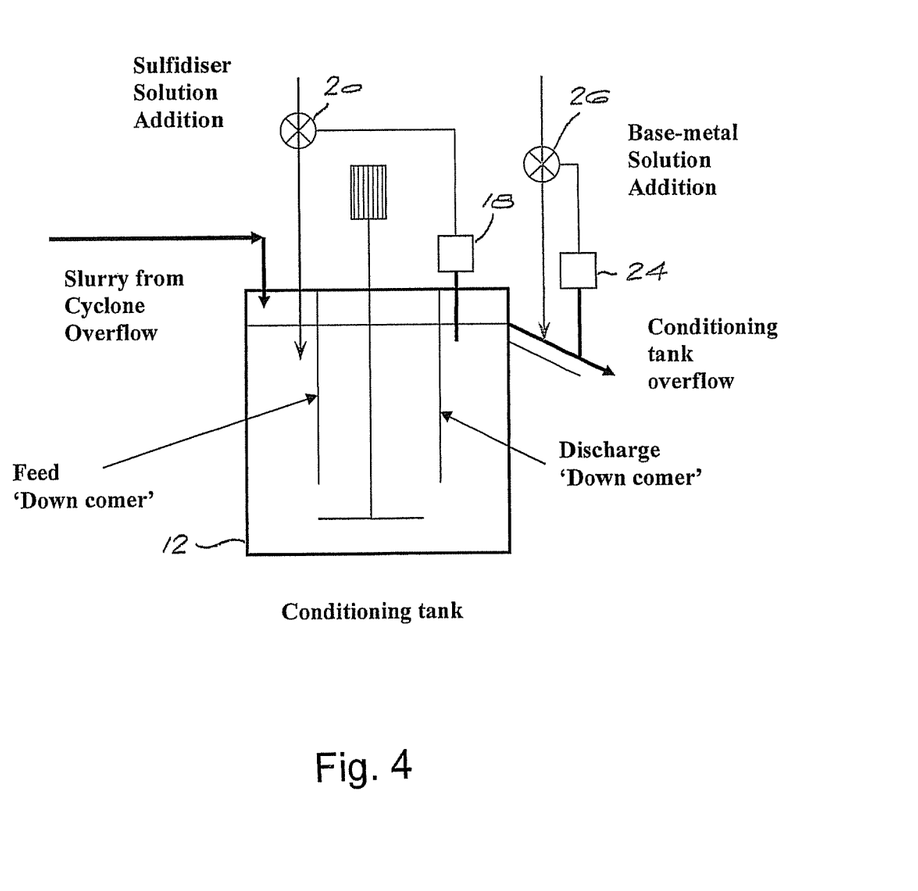

FIGS. 2 to 4 show practical variations of the installation of FIG. 1. In all cases, ore containing the minerals of interest from either Group 1 or Group 2, as described above, is mined and transported to the size reduction facilities where the ore is crushed, milled and classified to produce a slurry of the desired percentage solids (e.g. 40%) and the desired sizing (e.g. 80% passing 74 microns or to those skilled in the art, $P_{80}$ of 74 microns).

The slurry is fed to the agitated conditioning tank 12 for the conditioning stages that will achieve the desired sulfidisation of the surfaces of the minerals of interest. The conditioning tank is of such volume that, based on the flow rate of the slurry, a residence time, assuming no short circuiting, of between 0.1 and 30 minutes, preferably 2 to 5 minutes, is achieved contacting the sulfidising solution. Those skilled in the art will be aware that the elimination of short circuiting can be typically achieved by employing "down comers", which can conveniently be used in the addition as well as measurement points for control equipment such as probes.

The preferred approach involves the addition of the base-metal solution, preferably soluble iron or copper salts, to the conditioning tank while the sulfidising solution is also being added, as indicated schematically in FIG. 2. Not withstanding this preference, the base-metal solution may conveniently be added just prior to sulfidisation, by introducing the base-metal solution into the slurry feed to the conditioning tank as shown in FIG. 3, or indeed after sulfidisation, by introducing the base-metal solution into the conditioning tank overflow as shown in FIG. 4.

The conditioned slurry is then feed to downstream processes where recovery of the now sulfidised minerals can be achieved. It is recognised that, depending upon the recovery process selected, further conditioning stages may be required in order to exploit the benefits offered by the freshly prepared sulfide surfaces. For example, as known by those skilled in the art, where the flotation process is selected as the means of recovery, further surface preparation with other reagents is required. Thus the slurry containing the freshly prepared sulfidised surfaces would be contacted with depressants, collectors, activators and a frother, as determined by previous metallurgical testwork. Where reagent contact times greater than 0.5 minutes are required, conditioning tanks are employed.

The general process flow of the installations of FIGS. 1 to 4 is as follows:

1. An ore containing the minerals of interest is subjected to size reduction, usually 100% passing 106 microns, to achieve liberation between the minerals of interest and the non-economic or gangue minerals. Size reduction typically consists of comminution by a series of crushing and grinding or milling operations in conjunction with a series of sizing and classification operations, such as screening and hydro-cycloning.
2. The milled and classified ore is prepared as an aqueous slurry or pulp containing between 15% and 40% solids, depending on the amount of fines, particularly clays, present. If excessive quantities of fines are present and known to harm recovery downstream processes, then a de-sliming step may be carried out unless excessive losses of the minerals of interest are experienced.
3. A sulfidiser solution of a known strength is prepared by adding a soluble sulfidiser such as sodium hydrosulfide to water. The strength is determined by the sulfidising requirements and the subsequent consumption by the slurry. The sulfidiser solution is added to the slurry containing the minerals of interest using the Control Potential Sulfidisation (CPS) technique as described by Jones and Woodcock (1979). The essence of this technique is the maintenance of a constant concentration of sulfide ions during the conditioning period with the sulfidiser solution. This is achieved with the use of an ion-specific probe that measures only sulfide ions, such as a silver/silver sulfide electrode, which measures the sulfide ion concentration as a potential. This is known as the sulfide ion electrode potential, $E_s$ (mV).
4. Typical sulfidisation conditions are as follows:
    (a) sulfidisation conditioning time between 0.1 and thirty minutes, preferably 2 to 5 minutes;
    (b) sulfide ion electrode potential ($E_s$) between −300 and −1100 mV, preferably between −500 and −800 mV.

The $E_s$ values were measured with an Orion 9616 combination electrode probe Silver/Silver Sulfide electrode with a silver/silver chloride reference electrode with 0.01M KCl reference solution (335 mV SHE).
5. A solution of base-metal ions of known strength is prepared by adding a soluble base-metal salt to water. The strength is determined by the reaction requirement and the quantity to be added varies depending upon which group of minerals the mineral of interest belongs to. After the desired sulfidisation potential has been achieved, the required quantity of base-metal ions is added to the slurry during the sulfidisation conditioning stage. It is preferable and yields the best degree of sulfidisation when the base-metal additions are made during sulfidisation. However, such base-metal ion additions may be made before or after sulfidisation.

The soluble base-metal salts may conveniently be selected from those that are commonly available and the most cost effective such as, but not limited to, iron, copper, nickel, cobalt, manganese, zinc, lead, chromium, vanadium, mercury, etc. In practice, iron and copper salts would appear the most practical choices as either sulfates, chlorides or nitrates. Ideally, the quantity of soluble base-metal salt required should be determined by EDTA extraction studies on the minerals of interest at the size range selected for optimal recovery by downstream processing. In summary, the actual quantity of base-metal ions required for the mineral of interest is controlled by the mineral type, surface area and proportion in the milled and classified ore. The following guidelines are given, based on a feed grade of 1 to 5% of the mineral of interest:
    (a) Group 1 minerals, 1-100 g/t of base-metal ion, and for
    (b) Group 2 minerals, 10-100 g/t of base-metal ion.
6. The ore containing the minerals of interest has been sulfidised and is ready for recovery by the downstream process.

In the application to practice, two control or monitoring features are incorporated. The first feature is the control of the CPS process through the use of an Oxidation-Reduction Potential (ORP) probe in place of the silver/silver sulfide electrode system. The sulfidisation conditioning potential is checked every two hours or so against the measured $E_s$, thereby keeping the sulfide ion concentration within the desired range. The addition of the base-metal ions can also be made using a similar control loop, whereby the base-metal ion concentration is continuously measured with an ion specific probe and the desired solution concentration maintained by solution addition as indicated schematically in FIG. 1. This method provides the optimum process conditions for the successful sulfidisation of the oxidised and surface oxidised base and precious metal surfaces.

Example of Application: Oxidised Pentlandite

Pentlandite, a nickel iron sulfide [$(Fe,Ni)_9S_8$], is a particularly important source of nickel and is mined in several countries, notably Canada, Australia, the Soviet Union, China and Brazil. Central and Southern Africa as well as South America have significant potential for nickel sulfide deposits. Pentlandite is recovered and concentrated for subsequent nickel extraction using the froth flotation process. As found for other iron-bearing sulfide minerals, the applicants have established that flotation recovery of pentlandite quickly deteriorates with surface oxidation.

A micro-flotation cell was employed to assess the floatability of the pentlandite samples using sodium iso-butyl xanthate (SIBX) as the collector at pH 9 and in the presence of $3.333 \times 10^{-3}$M calcium ions. The samples weighed two grams and flotation tests were conducted in duplicate over 20 minutes. For oxidised samples, the SIBX strength was $1.375 \times 10^{-2}$M while $1.375 \times 10^{-3}$M was adequate for the flotation of sulfidised samples. The sulfidisation method used the CPS technique and all reported sulfide ion electrode potential values ($E_s$) are relative to a silver/silver sulfide electrode with a silver/silver chloride reference electrode and 0.01M KCl reference solution (335 mV SHE). In order to elucidate the nature of the sulfidisation mechanism, the sulfidised solution was decanted and replaced with fresh solution prior to flotation. However in practice, there is no need to replace the sulfidisation solution prior to any down stream mineral recovery process, such as flotation.

A purified pentlandite sample (>98% pentlandite) was prepared from an ore sample from the Raglan deposit in Canada. The sample was prepared into three size fractions, namely −106/+74 microns, −74/+53 microns and −53/+38 microns, and oxidised using two methods (a chemical method using hydrogen peroxide and a thermal method using low temperatures) to produce heavily oxidised samples that did not float (see Table 1 below). SE is the Standard Error. The quantities of base-metal ions used in this study were equivalent to ~1.0 gm/kg of mineral of iron as ferric chloride and ~0.01 gm/kg of mineral of copper as copper sulfate.

TABLE 1

Oxidised Pentlandite Flotation Recoveries

| Sample Treatment | Flotation Recovery (%) |
| --- | --- |
| Thermal Oxidation (121 days) | 3.4 ± 1.3 (SE) |
| Chemical Oxidation (10 min @ $10^{-2}$ M $H_2O_2$) | 2.2 ± 1.0 (SE) |

Figure 5:
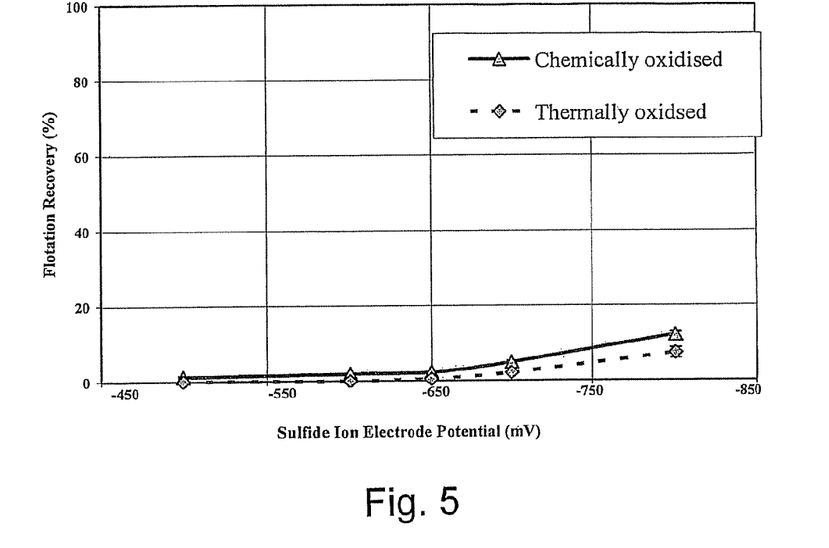
FIG. 5 is a graph showing the effect of sulfidisation intensity on the flotation recovery of oxidised pentlandite.

FIG. 5 shows that oxidised pentlandite responds poorly to sulfidisation and X-ray photo-electron spectroscopic (XPS) analyses of the sulfidised surfaces of oxidised pentlandite confirmed that little surface sulfidisation had occurred.

Figure 6:
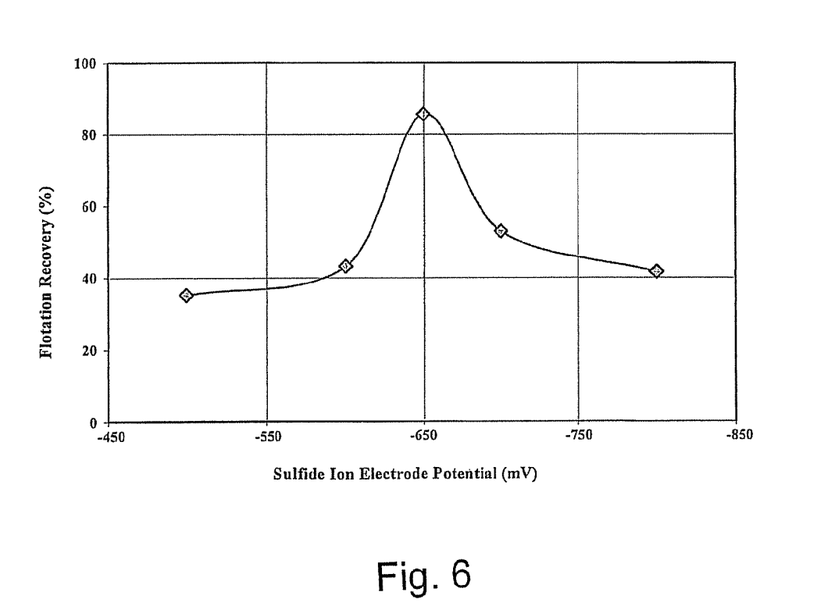
FIG. 6 is a graph showing the effect on the flotation recovery of oxidised pentlandite due to the introduction of iron during the sulfidisation process.

The introduction of iron during the sulfidisation process caused a significant improvement in the flotation recovery of oxidised pentlandite, particularly between −600 and −700 mV, and specifically at −650 mV in these studies (see FIG. 6).

Both iron and copper had a significant effect when introduced during sulfidisation (see Table 2 below). Addition of base-metal ions prior to sulfidisation was beneficial, particularly with copper ions, however not as beneficial as additions made during sulfidisation.

TABLE 2

Effect of base-metal ion additions upon the flotation recovery of oxidised pentlandite at an Es of −650 mV

| Sample Treatment | Flotation Recovery (%) |
| --- | --- |
| Sulfidisation only | 2.8 ± 2.0 (SE) |
| $Cu^{2+}$/decant/sulfidisation | 22.9 ± 1.1 (SE) |
| $Cu^{2+}$ during sulfidisation | 42.12 ± 1.3 (SE) |
| $Fe^{3+}$/decant/sulfidisation | 12.91 ± 1.2 (SE) |
| $Fe^{3+}$ during sulfidisation | 80.34 ± 1.6 (SE) |

A technique has been described to sulfidise the surfaces of oxidised pentlandite whereby soluble base-metal ions are introduced into the slurry during sulfidisation. It is recognised that benefits in the sulfidisation of the oxidised pentlandite may be obtained by the addition of base-metals before and indeed after sulfidisation, however the optimum benefits are obtained by additions of base-metal ions during sulfidisation. Under these circumstances, the base-metal sulfides can directly precipitate and become attached onto the oxidised pentlandite surfaces, thereby rendering the treated mineral recoverable to processes that exploit surface differences.

It is envisaged that the method used in the above example for base metal recovery from oxidised pentlandite can be extended to and beneficial for the recovery of precious metals contained in oxidised and surface oxidised sulfide minerals. Platinum group elements (PGE), for example, are often found as sulfide and arsenide minerals such as cooperite (Pt, Pd, Ni)S and sperrytite ($PtAs_2$). The near surface regions of these ore bodies become weathered and, when mined and treated by flotation, poor flotation recoveries are experienced. The application of sulfidisation and the addition of base metal ions are expected to provide improved recovery of metal values from such minerals.

The invention claimed is:

1. A method of treating value bearing material comprising oxidised or surface oxidised mineral values, the method including the steps of:
   (a) crushing the value bearing material;
   (b) contacting the crushed value bearing material, in slurry form, with a sulfide solution comprising a soluble sulfidiser, while maintaining sulfide ion concentration at a predetermined value, to sulfidise the oxidised or surface oxidised mineral values; and
   (c) adding ions of a selected base metal to the crushed value bearing material; wherein the oxidised or surface oxidised mineral values comprise oxidised or surface oxidised sulfide base metal minerals, or minerals including arsenides, antimonides, selenides and tellurides, or surface oxidised precious metal minerals.

2. The method of claim 1 wherein the surface oxidised sulfide base metal minerals are one or more of copper, nickel, iron, zinc, lead, cobalt, manganese, chromium, vanadium, cadmium, mercury and bismuth.

3. The method of claim 1 wherein the surface oxidised precious metal minerals are one or more of gold, silver and platinum group elements.

4. The method of claim 3 wherein the platinum group elements are platinum and/or palladium.

5. The method of claim 1 wherein the oxidised sulfide base metal minerals and surface oxidised precious metal minerals are selected from oxides, hydroxides, oxy-hydroxides, carbonates, hydroxy-carbonates, sulfates, hydroxy-sulfates, phosphates, silicates, hydroxy-silicates, arsenates, chromates and vandanates.

6. The method of claim 1 wherein the crushed value bearing material is prepared as a slurry or pulp.

7. The method of claim 1 wherein the soluble sulfidiser is sodium hydrosulfide.

8. The method of claim 1 wherein the sulfide ion concentration in the slurry is measured with a suitable ion-specific probe which measures the sulfide ion concentration as a potential, and the sulfidiser solution in the slurry is in a quantity that is adjusted to maintain the measured sulfide ion concentration at or near the predetermined value.

9. The method of claim 6 wherein the step of adding ions of a selected base metal to the crushed value bearing material is carried out by adding a soluble base metal salt to water to prepare a solution of base metal ions, and adding the solution to the slurry.

10. The method of claim 6 wherein the base metal ions is added to the slurry during the step of contacting the crushed value bearing material with a sulfide solution after the desired sulfidisation potential has been achieved.

11. The method of claim 1 wherein the selected base metal is selected from iron, copper, nickel, cobalt, manganese, zinc, lead, chromium, vanadium and mercury.

12. The method according to claim 1 wherein the selected base metal comprises a soluble base-metal salt selected from iron or copper salts as sulfates, chlorides or nitrates.

* * * * *